United States Patent [19]
Ohshima et al.

[11] Patent Number: 5,381,878
[45] Date of Patent: Jan. 17, 1995

[54] STRUCTURE OF REVERSE BRAKE FOR AUTOMOBILE TRANSMISSION

[75] Inventors: Katsutoshi Ohshima; Norihide Urabayashi; Satoshi Fujikawa, all of Hiroshima, Japan

[73] Assignee: Mazda Motor Corporation, Hiroshima, Japan

[21] Appl. No.: 3,701

[22] Filed: Jan. 13, 1993

[30] Foreign Application Priority Data

Jan. 13, 1992 [JP] Japan .................................. 4-003710

[51] Int. Cl.⁶ ............................................. F16D 23/02
[52] U.S. Cl. .................................. 192/4 A; 192/4 B; 192/53 F; 192/114 T
[58] Field of Search ............. 192/4 A, 4 B, 4 C, 53 F, 192/114 T

[56] References Cited

U.S. PATENT DOCUMENTS

| | | | |
|---|---|---|---|
| 4,276,972 | 7/1981 | Burnett et al. | 192/4 C |
| 4,294,338 | 10/1981 | Simmons | 192/4 A |
| 4,373,618 | 2/1983 | Sabel | 192/4 B |
| 4,598,599 | 7/1986 | Ikemoto | 192/4 C X |
| 4,848,548 | 7/1989 | Diehl | 192/114 T X |
| 4,969,369 | 11/1990 | Okubo et al. | 192/4 C X |
| 5,052,986 | 10/1991 | Jarchow et al. | 192/114 T X |

FOREIGN PATENT DOCUMENTS

| | | | |
|---|---|---|---|
| 58-214021 | 12/1983 | Japan | 192/114 T |
| 61-96312 | 1/1988 | Japan . | |

*Primary Examiner*—Andrea L. Pitts
*Attorney, Agent, or Firm*—Keck, Mahin & Cate

[57] ABSTRACT

A reverse brake mechanism for an automobile transmission has a synchronizing mechanism including a clutch sleeve, mounted for sliding movement on a primary transmission shaft, which has peripheral clutch teeth with chamfers arranged at regular separations. A synchronizing ring, mounted for rotation on the primary shaft, has peripheral synchronizing teeth with chamfers arranged at regular separations, and a brake member is provided for braking the primary shaft. The brake member is operationally coupled to the primary shaft through the synchronizing ring while the clutch sleeve is brought into engagement with the synchronizing ring through their teeth with chamfers when shifting the automobile transmission to a reverse gear.

12 Claims, 7 Drawing Sheets

STRUCTURE OF REVERSE BRAKE FOR AUTOMOBILE TRANSMISSION

BACKGROUND OF THE INVENTION

1. Field of the Invention

This invention relates to a transmission for an automobile and, more particularly, to a structure of a reverse brake of an automobile transmission having a reverse gear.

2. Description of Related Art

Transmissions typically have reverse brake devices, which are constructed by a brake gear mechanism and a synchronising device. The reverse brake device includes a primary brake gear mounted for rotation on a primary or input transmission shaft, and a secondary brake gear, which remains in mesh with the primary brake gear, mounted for rotation on a secondary or output transmission shaft. On the other hand, the synchronizing device, mounted on the primary or input transmission shaft, includes a clutch hub, a clutch hub sleeve, and a synchronizing ring and creates a synchronism between the primary or input and secondary or output transmission shaft through the reverse gear device. Such a reverse brake device is known from, for instance, Japanese Unexamined Utility Model Application No. 61-96312, subsequently published as Japanese Unexamined Utility Model Publication No. 63-3546.

In the reverse brake device described in the above publication, speed reduction of the primary or input transmission shaft or stoppage of the primary or input transmission shaft is achieved by bringing the synchronizing ring into engagement with the clutch hub sleeve and depressing it against a synchronizing element of the primary brake gear. This reverse brake structure causes difficulty separating a chamfer of the synchronizing ring from the clutch hub sleeve.

SUMMARY OF THE INVENTION

It is therefore an object of the present invention to provide a structure of a reverse brake for an automobile transmission in which separation between a synchronizing ring and a clutch hub sleeve of the synchronizing mechanism is easily achieved.

The foregoing object of the present invention is accomplished by providing a reverse brake mechanism for an automobile transmission having a primary shaft through which engine torque is transmitted to the automobile transmission, a secondary shaft through which engine torque is transmitted from the automobile transmission, and a synchronizing, mechanism for synchronizing in rotation, the primary shaft and the secondary shaft. The synchronizing mechanism includes a clutch sleeve, a synchronizing ring and a brake means. The clutch sleeve, which is mounted for sliding movement on the primary shaft but is fixed in rotation relative to the primary shaft, has peripheral clutch teeth with chamfers arranged at regular separations. The synchronizing ring is mounted for rotation on the primary shaft and has peripheral synchronizing teeth with chamfers arranged at regular separations. The brake means includes a primary brake gear mounted for rotation on the primary shaft and a secondary brake gear mounted for rotation with the secondary shaft. The secondary gear is in mesh with said primary brake gear at all times, operationally coupled to the primary shaft through the synchronizing ring while the clutch sleeve is brought into engagement with the synchronizing ring, through their teeth with chamfers, when shifting the automobile transmission to a reverse gear. Peripheral teeth with chamfers of the synchronizing ring are arranged at regular separations, each of which is larger than a circumferential width of a chamfered tooth of the clutch sleeve.

BRIEF DESCRIPTION OF THE DRAWINGS

The above and other objects and features of the present invention will be clearly understood from the following detailed description of preferred embodiments thereof when considered in conjunction with the accompanying drawings, wherein similar reference numerals have been used to denote the same or similar elements throughout the drawings, and in which.

DETAILED DESCRIPTION OF THE PREFERRED EMBODIMENT

Because automobile transmissions are well known, the present description will be directed in particular to elements forming part of, or cooperating directly with, an apparatus in accordance with the present invention. It is to be understood that parts or elements which are not of direct importance to the invention and parts or elements which are purely of conventional constructions will not be described in detail and that parts or elements not specifically shown or described can take various forms well known to those skilled in the automobile art.

Figure 1:
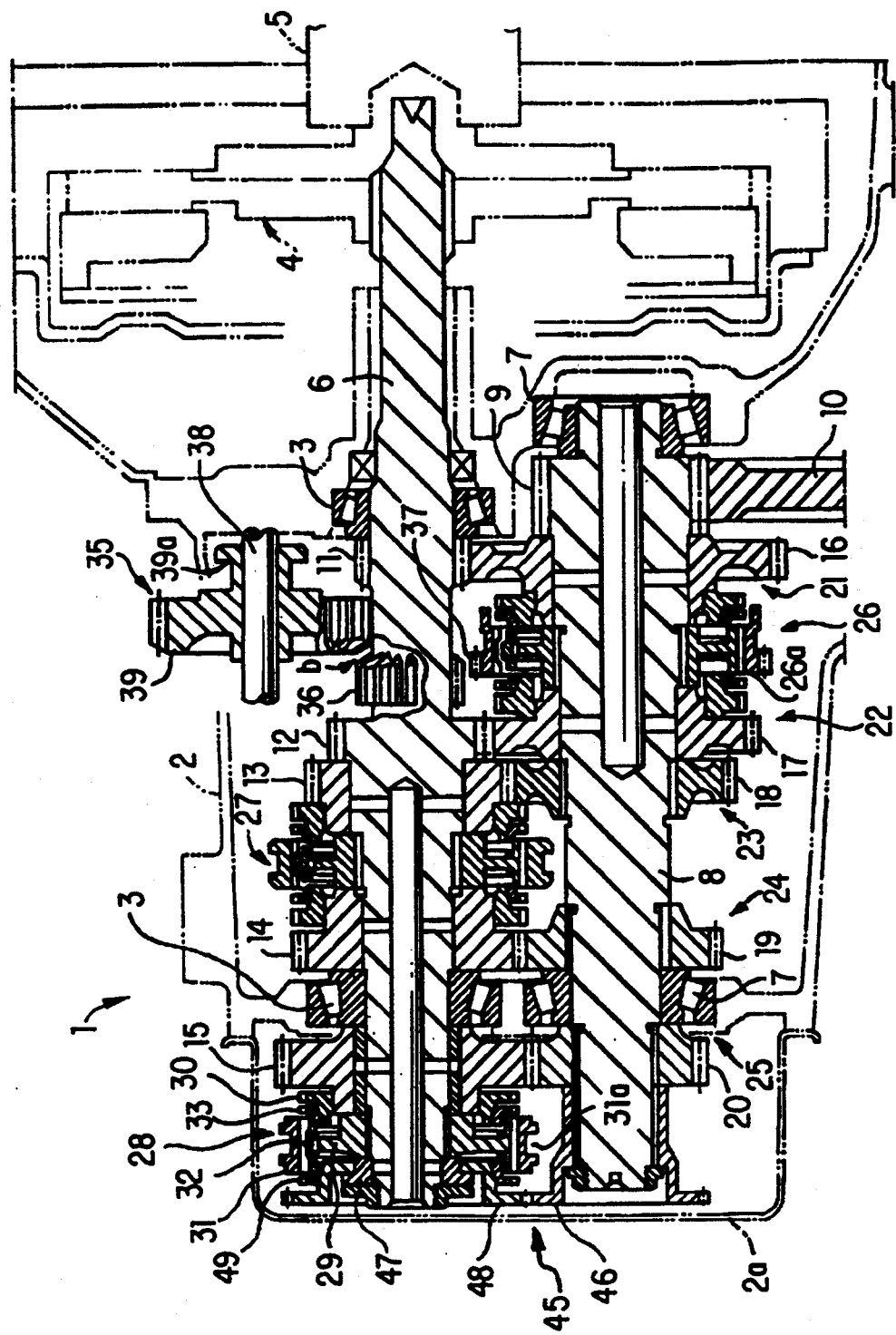
FIG. 1 is a longitudinal-sectional view of a transmission having a structure of a reverse brake in accordance with a preferred embodiment of the present invention.

Referring to the drawings in detail and, in particular, to FIG. 1, an automobile transmission 1, such as a five forward speed transmission, which has a structure of reverse gear in accordance with a preferred embodiment of the present invention, has a transmission case 2 and a case cover 2a. The transmission 1 includes a primary or input shaft 6, supported for rotation by the transmission case 2 by means of a pair of thrust bearings 3, which extends in the axial direction of the transmission 1 and is operationally coupled to an engine output shaft 5 through a clutch 4. The transmission 1 further includes a secondary or output shaft 8, supported for rotation by the transmission case 2 by means of a pair of thrust bearings 7, which extends in the axial direction of the transmission 1 and in parallel with the primary or input shaft 6. The secondary or output shaft 8 is formed integrally with an output gear 9 at its forward end, through which it is coupled to a differential, simply shown by a differential input gear 10, so as to transmit transmission output to drive wheels.

Five forward gears, i.e. first, second, third, fourth and fifth gears 21–25, are provided between the primary or input and secondary or output shafts 6 and 8. Specifically, first to fifth primary gears 11–15 are always in mesh with first to fifth secondary gears 16–20 correspondingly so as to provide the first to fifth gears 21–25, respectively. The primary gears 11 and 12 are formed integrally with, or otherwise secured to, the primary or input shaft 6. Similarly, the secondary gears 18, 19 and 20 are formed integrally with, or otherwise secured to, the secondary or output shaft 8. On the other hand, every one of the remaining gears is mounted for rotation on the primary or input shaft 6 or the secondary or output shaft 8.

The transmission 1 is provided with three synchronizing mechanisms 26, 27 and 28. A synchronizing mechanism 26, which is actuated for a gear shift between the first and second gears, is positioned between the first and second secondary gears 16 and 17 of the first and second gears 21 and 22, respectively. A synchronizing mechanism 27, which is actuated for a gear shaft between the third and fourth gears, is positioned between the third and fourth primary gears 13 and 14 of the third and fourth gears 23 and 24. A fifth gear synchronizing mechanism 28, which is actuated for a gear shift to the fifth gear 25, is positioned after the fifth primary gear 15 of the fifth gear 25. Any one of the synchronizing mechanisms 26–28 is actuated by a manually operated gear shift lever (not shown) to selectively bring the primary gears 13–15 and the secondary gears 16–17 into operational coupling to the primary or input shaft 6 or the secondary or output shaft 8.

Because all of the synchronizing mechanisms 26, 27 and 28 are identical in structure and operation, only one of them, for example the fifth gear synchronizing mechanism 28, will be hereafter described for simplicity. The fifth gear synchronizing mechanism 28 includes a clutch hub 29 spline-coupled, or otherwise secured, to the primary or input shaft 6, a spline ring 30 positioned behind and secured to the fifth primary gear 15, a clutch hub sleeve ring 31 externally spline-coupled for axial relative to the clutch hub 29, and a synchronizing ring 33 positioned axially between the spline ring 30 and the clutch hub sleeve ring 31. Axially between the clutch hub 29 and the clutch hub sleeve ring 31, there are disposed a plurality of keys 32, forming part of the fifth gear synchronizing mechanism 28, arranged around the clutch hub 29 at equal angular separations. The clutch hub sleeve ring 31 is formed with an outer peripheral groove 31b, which groove 31b is engaged by a shift fork 34 secured to the rear end of a shift rod 40 (see FIG. 2). The keys 32 are ordinarily forced radially outwardly by a pair of spring rings 32a mounted on a boss 29a of the clutch hub 29 of the fifth gear synchronizing mechanism 28. However, after having brought the keys 32 into contact with the synchronizing ring 33 or 49, the spring rings 32a contract radially so as to allow the clutch hub sleeve ring 31 to further move axially riding over the key 32 until meshing with the synchronizing ring 33 or 49. In shift operation to the reverse gear, when the clutch hub sleeve ring 31 is moved axially toward the fifth primary gear 15 by the shift fork 34, it brings itself into engagement with the synchronizing ring 33, and simultaneously, it presses the synchronizing ring 33 against the spline ring 30 through the keys 32. Accordingly, the spline ring 30 and the clutch hub sleeve ring 31 are synchronized in rotation with each other by means of the synchronizing ring 33, and then, the clutch hub sleeve ring 31 slides smoothly and engages with the spline ring 30. As a result, the fifth primary gear 15 operationally couples to the primary or input shaft 6 through an engagement among the spline ring 30, the clutch hub sleeve ring 31 and the clutch hub 29 in this order.

The transmission 1 is further provided with a reverse gear mechanism 35 between the first and second gears 21 and 22. The reverse gear mechanism 35 includes a primary reverse gear 36, a secondary reverse gear 37 and an idle gear 39. The primary reverse gear 36 is integrally structured with, or otherwise secured to, the primary or input shaft 6. The secondary reverse gear 37 is formed as an external peripheral gear ring of a clutch hub sleeve ring of the synchronizing mechanism 26 for a gear shift between the first and second gears 21 and 22. The idle gear 39 is mounted for rotation and axial movement on a shaft 38, which is shown as turned approximately 90 degrees with respect to the primary or input shaft 6 in FIG. 1. When the idle gear 39 is slid rearward by means of a shift mechanism (which will be described later), it meshes with both of the primary reverse gear 36 and the secondary reverse gear 37 and operationally couples them, and hence the primary or input shaft 6 and the secondary or output shaft 8.

Figure 2:
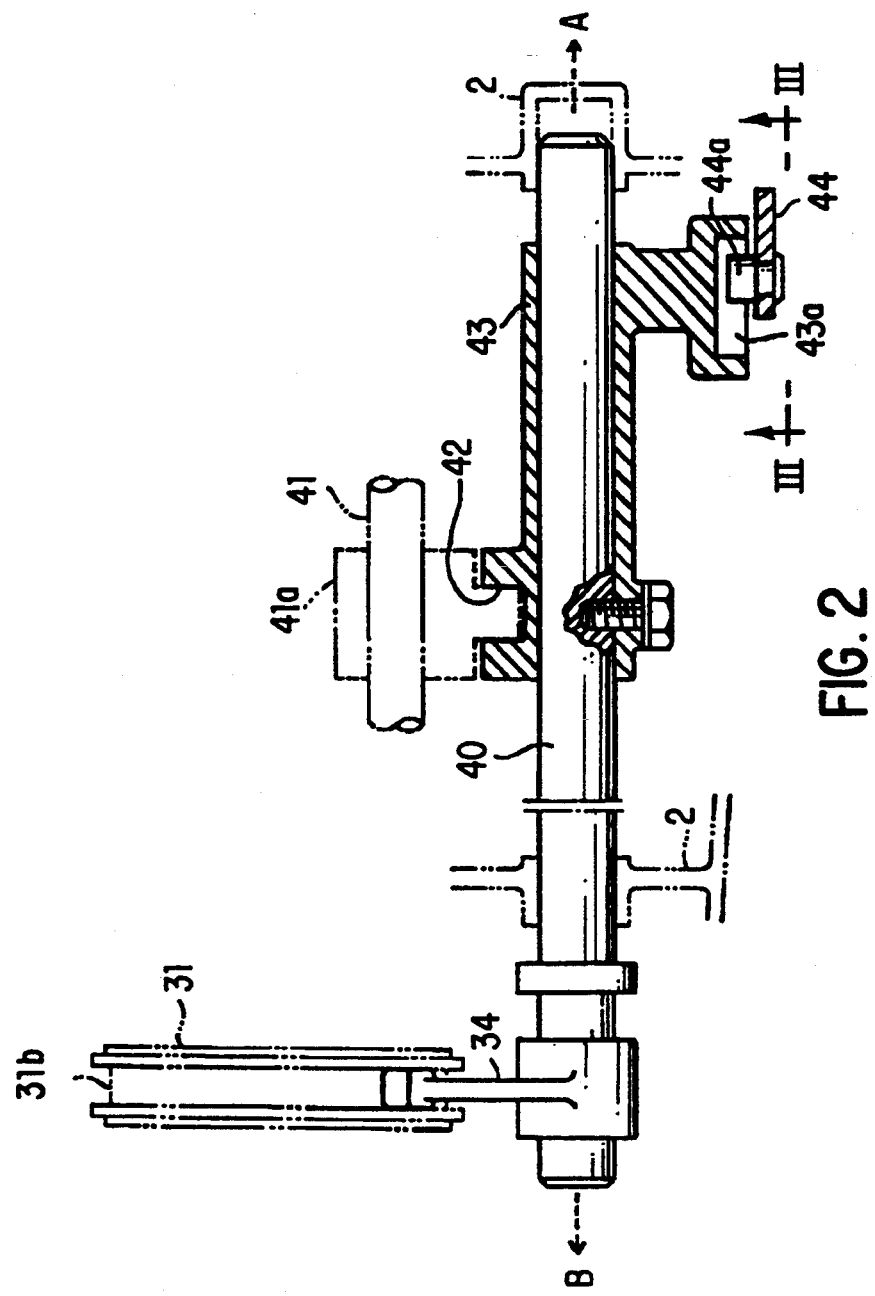
FIG. 2 is a side view of a transmission shaft assembly.

Referring to FIG. 2, a shift mechanism for shifting the reverse gear mechanism 35 to its actuated state includes a shift rod 40, for shifting the transmission to a reverse gear from the fifth gear, which is positioned in parallel with both the primary or input and secondary or output shafts 6 and 8 and is supported for axial slide movement by the transmission case 2. This shift rod 40 is axially slid back and forth by means of turning and sliding of a shift control rod 41 caused by the gear shift lever. Specifically, when the shift control rod 41 is turned around the shift rod 40 in opposite directions, its projection 41a is engaged by and disengaged from a stop recess 42 of a sleeve 43 secured to the shift rod 40. For example, the shift rod 40 is slid axially forward as shown by a reference A by the shift control rod 41 with its projection 41a engaged by the stop 42 of the sleeve 43 when the gear shift lever is operated to select the fifth gear, and, on the other hand, is slid axially rearward as shown by a reference B by the shift control rod 41 with its projection 41a engaged by the stop 42 of the sleeve 43 when the gear shift lever is operated to select the reverse gear. Such a forward movement of the shift rod 40 forces the clutch hub sleeve ring 31 engaged by the shift fork 34 forward, so as to achieve operational coupling between the fifth primary gear 15 and the primary or input shaft 6 so as to complete the fifth gear.

Figure 3:
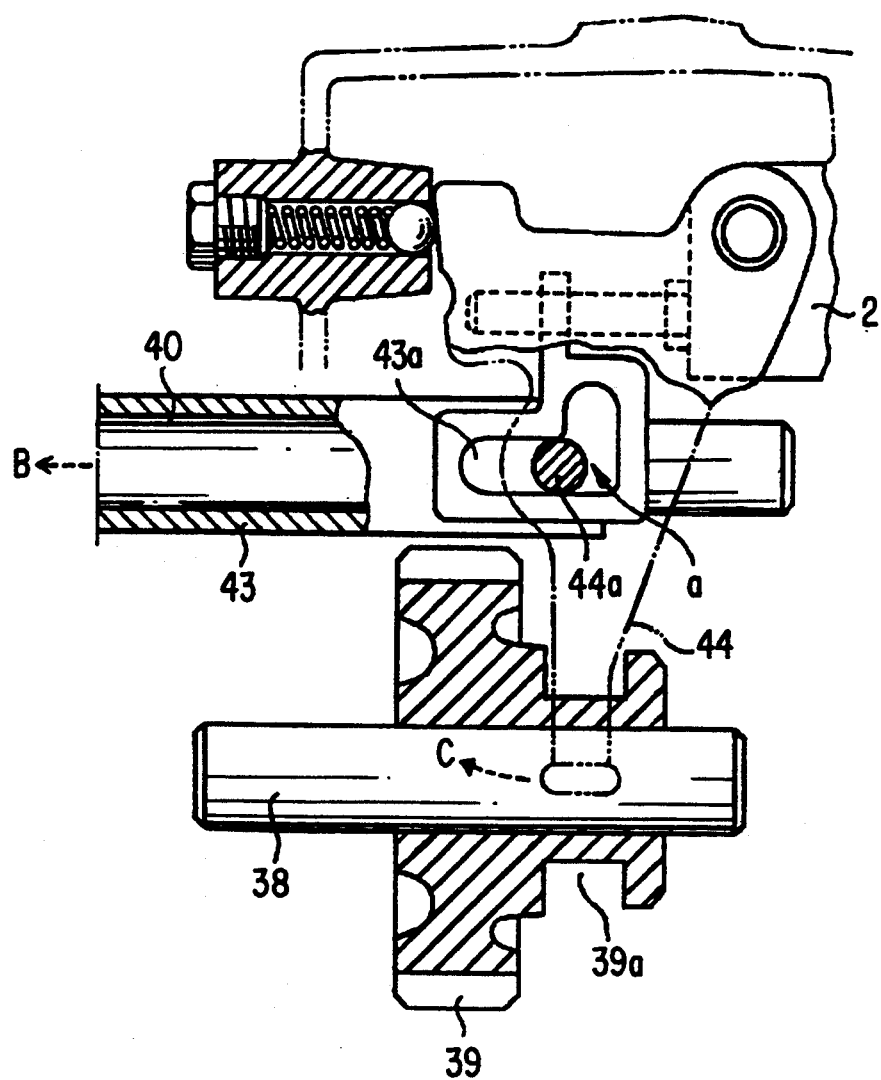
FIG. 3 is an enlarged bottom view of the transmission shaft assembly along line III—III of FIG. 2.

The sleeve 43, fitted and secured to the forward end of the shift rod 40, is formed with a generally L-shaped groove 43a as shown in FIG. 3, which receives a pin 44a, extending from a shift fork 44 supported for axial slide movement by the transmission case 2 and engaged by an annular groove 39a formed in the periphery of the idle gear 39. By means of the engagement between the shift fork 44 and the idle gear 39, when the shift rod 40 is slid axially rearward, it forces the shift fork 44 to turn in a clockwise direction as shown by an arrow C in FIG. 3 so as to cause an axial movement of the idle gear 39 toward the primary reverse gear 36. During this axial movement, the clutch hub sleeve ring 31 of the fifth gear synchronizing mechanism 28 simply slides on the clutch hub 29.

Figure 4:
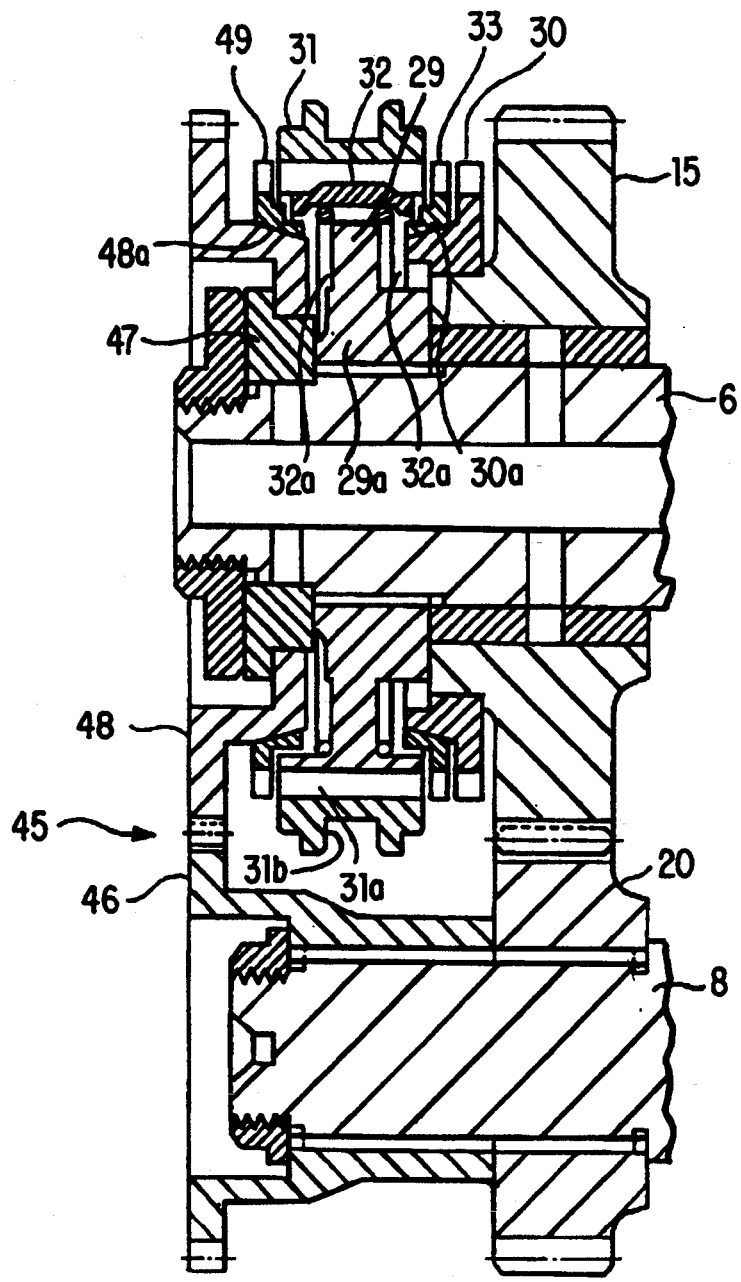
FIG. 4 is an enlarged view of an essential part of the transmission.

Referring to FIG. 4, the transmission 1 is further provided with a reverse brake mechanism 45 between rearward ends of the primary or input and secondary or output shafts 6 and 8. The reverse brake mechanism 45 includes a primary brake gear 48, a secondary brake gear 46 and the synchronizing ring 49. The primary brake gear 48 is externally, relatively loosely fitted to a sleeve 47 positioned rearward of the boss 29a of the clutch hub 29 of the fifth gear synchronizing mechanism 28, and is in mesh with the secondary brake gear 46 at all times. The secondary brake gear 46 is spline-coupled to the secondary or output transmission shaft 8. As seen in detail in FIG. 4, the primary brake gear 48 is formed with a tapered boss 48a on which the synchronizing ring 49 is loosely mounted for rotation. The spline ring 30 is formed with a tapered boss 30a on which the synchronizing ring 33 is mounted for rotation. The tapered bosses 30a and 48a are placed symmetrically with respect to all of the clutch hub 29, the clutch hub sleeve ring 31 and the key 32. Similarly, the synchronizing rings 33 and 49 are placed symmetrically with respect to all of the clutch hub 29, the clutch hub sleeve ring 31 and the key 32.

Figure 5:
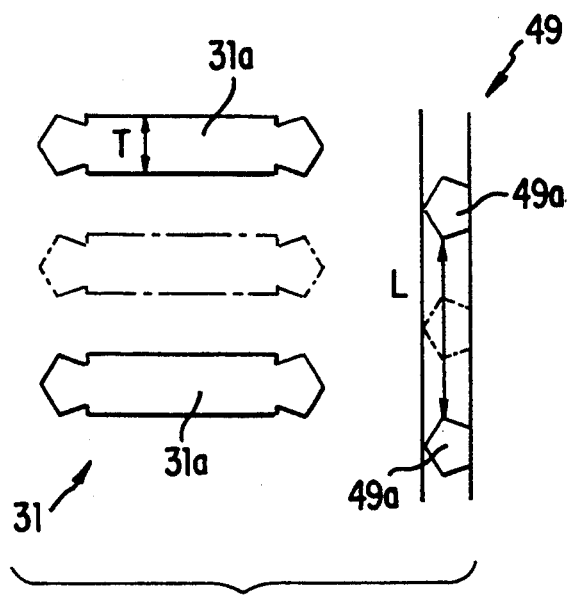
FIG. 5 is an illustration showing a positional correlation between a synchronizing ring and a clutch hub sleeve of a synchronizing device of the transmission before their teeth with chamfers are engaged.
Figure 6:
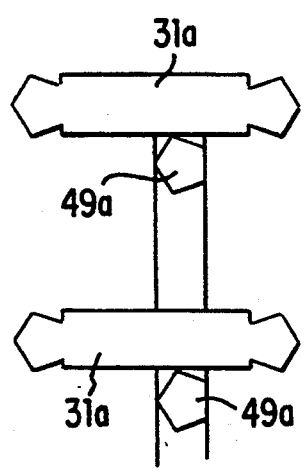
FIG. 6 is an illustration showing a positional correlation between the synchronizing ring and the clutch hub sleeve after teeth with chamfers are in engagement.

Referring to FIGS. 5 and 6, the clutch hub sleeve ring 31 is formed with a plurality of internal teeth 31a, with chamfers, disposed at equal angular separations, and the synchronizing ring 49 is formed with a plurality of external teeth 49a, also with chamfers, disposed at equal angular separations. A separation or distance L between adjacent teeth 49a of the synchronizing ring 49 is larger than the circumferential width T of each tooth 31a of the clutch hub sleeve ring 31. In other words, comparing with synchronizing rings and clutch hub sleeves of ordinary synchronizing mechanisms, some of the teeth 49a and 31a, for instance every other ones, of each of the synchronizing ring 49 and the clutch hub sleeve 31 are regularly cut away as shown in FIG. 6.

In the shift operation of the transmission 1 to the reverse gear, when the gear shift lever is operated to select the reverse gear while the clutch 4 is disconnected, the shift rod 40 starts to axially move rearward through the shift control rod 41 and the sleeve 43. The axial movement of the shift rod 40 causes the shift fork 44, whose pin 44a is movably received in the generally L-shaped groove 43a of the sleeve 43 fitted and secured to the forward end of the shift rod 40, to turn in the clockwise direction. Simultaneously, the idle gear 39 is moved toward the primary reverse gear 36 through the shift fork 44. Immediately before the idle gear 39 is brought into initial engagement with the primary reverse gear 36, it moves a distance corresponding to an initial stroke of the shift fork 40 which is the total distance of a play "a" (see in FIG. 3) between the pin 44a of the shift fork 44 and the generally L-shaped groove 43a of the sleeve 43 and an initial separation "b" (see in FIG. 1) between the primary reverse gear 36 and the idle gear 39.

During the initial stroke of the shift fork 44, brake force acts on the primary or input shaft 6. When the gear shift lever is not operated while the clutch 4 is disconnected the primary or input shaft 6 from the engine output shaft 5, despite the primary or input shaft 6 continuing its inertial rotation, it is in a neutral state wherein it is disconnected from both of the fifth gear 25 and the reverse brake mechanism 45, and operationally remains independent from both of the fifth primary gear 15 and the primary brake gear 48, so that both of the fifth primary gear 15 and the primary brake gear 48 remain unactuated. At this time, only the fifth gear synchronizing mechanism 28 rotatively cooperates with the primary or input shaft 6. Accordingly, only a relatively low moment of inertia acts on the primary or input shaft 6.

When the shift rod 40 further moves rearward, it forces the clutch hub sleeve ring 31 of the fifth gear synchronizing mechanism 28, which is spline-coupled to the primary or input shaft 6 and is rotating along with the same, rearward. As a result of the rearward axial movement, the synchronizing ring 49 of the reverse brake mechanism 45 is engaged by the clutch hub sleeve ring 31 and simultaneously is pressed against the tapered boss 48a of the primary brake gear 48. At this time, since the secondary or output shaft 8 remains stopped, the secondary brake gear 46 spline-coupled to the secondary or output shaft 8 does, of course, not rotate. This results in a development of contact resistance between the synchronizing ring 49 of the reverse brake mechanism 45 and the tapered boss 48a of the primary brake gear 48 in mesh with the secondary brake gear 46 at all times and mounted for rotation on the primary or input shaft 6, so as to create brake force acting on the primary or input shaft 6.

Since a moment of inertia acting on the primary or input shaft 6 is relatively low, only a low brake force is required to lower the rotational speed of the primary or input shaft 6 or stop it. Furthermore, since the distance L between each tooth 49a of each synchronizing ring 49 is larger than the circumferential width T of the tooth 31a of the clutch hub sleeve ring 31, the synchronizing ring 49 and the clutch hub sleeve ring 31 are easily separated without keying between the teeth 31a and 49a. Subsequently, when the shift rod 40 is moved beyond its initial stroke, it brings the idle gear 39 smoothly into mesh with the primary reverse gear 36.

In the manner described above, since even in the case that viscous oil, which suppresses inertial rotation of the primary or input shaft 6, has a low resistance or that an automatic choke establishes a high idle speed of an engine, a moment of inertia acting on the primary or input shaft 6 is still relatively low and the gear shift lever requires only a low operation force to actuate the reverse gear mechanism 35 smoothly and complete shifting the transmission 1 to the reverse gear.

Figure 7:
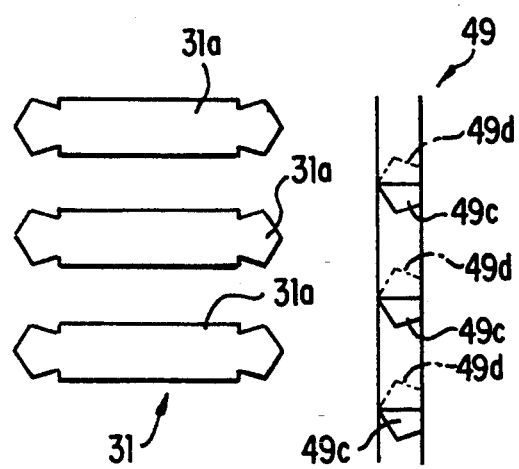
FIG. 7 is an illustration, similar to FIG. 5, showing a positional correlation between a synchronizing ring, having a half-cut tooth chamfer, and a clutch hub sleeve of a synchronizing device of the transmission before teeth with chamfers are engaged.

In order to cause the reverse gear mechanism 35 to actuate smoothly and complete shifting the transmission 1 to the reverse gear, each tooth of the synchronizing ring 49 may be otherwise cut half away. As shown in FIG. 7, the synchronizing ring 49 is formed with half teeth 49c, each being similar to what is left after cutting the corresponding half tooth 49d away from a complete tooth 49a (see FIG. 6).

In the reverse brake mechanism 45, the primary shaft 6 is rotationally synchronized with the secondary shaft 8. This is because, the fifth gear synchronizing mechanism is partly utilized in the reverse brake mechanism 45. However, it is sufficient for the reverse brake mechanism to stop the primary shaft 6.

Figure 8:
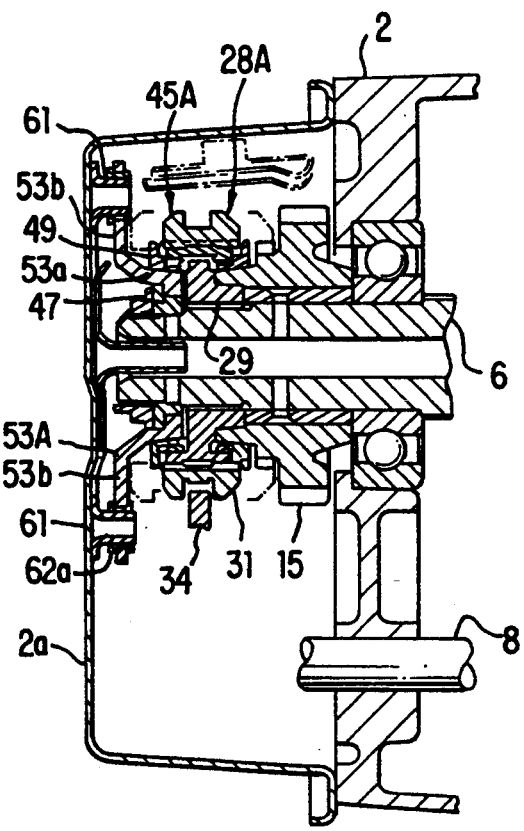
FIG. 8 is a longitudinal-sectional view of a transmission having a structure of a reverse brake in accordance with another preferred embodiment of the present invention.

Referring to FIG. 8, a reverse brake mechanism 45A in accordance with another preferred embodiment of the present invention is shown, which cooperates with a fifth gear synchronizing mechanism 28A. The reverse brake mechanism 45A includes a brake drum 53A, which is externally, relatively loosely fitted to a sleeve 47 positioned rearward of a clutch hub 29 of the fifth gear synchronizing mechanism 28. The brake drum 53A is formed with a tapered boss 53a on which a synchronizing ring 49 is loosely mounted for rotation. The brake drum 53A is further formed with a plurality of radially extending arms 53b. Each of the radial arms 53b is fixedly engaged by a retainer pin 61 extending from a case cover 2a of a transmission case 2. Between the retainer pin 61 and the radial arms 53b of the brake drum 53A, there is an elastic filler sleeve 62a for sound and vibration insulation.

When a shift rod 40 moves rearward, it forces the clutch hub sleeve ring 31 of the fifth gear synchronizing mechanism 28A, which is spline-coupled to the primary shaft 6 and is rotating along with the same, rearward. As a result of the rearward axial movement, the synchronizing ring 49 of the reverse brake mechanism 45A is engaged by the clutch hub sleeve ring 31 and simultaneously is pressed against the tapered boss 53a of the brake drum 53A. This results in a gradual development of contact resistance between the synchronizing ring 49 of the reverse brake mechanism 45 and the tapered boss 53a of the brake drum 53A restricted in rotation by the case cover 2a through the retainer pins 61, so as to create brake force acting on the primary shaft 6. Finally, the primary shaft 6 is synchronized in rotation with the secondary shaft 8 which remains stopped. During braking, rotational force acting on the brake drum 53A is dispersed by the retainer pins 61 and noise or sound and vibration transmitted to the case cover 2a are greatly reduced and effectively absorbed by the elastic filler sleeves 62a.

Figure 9:
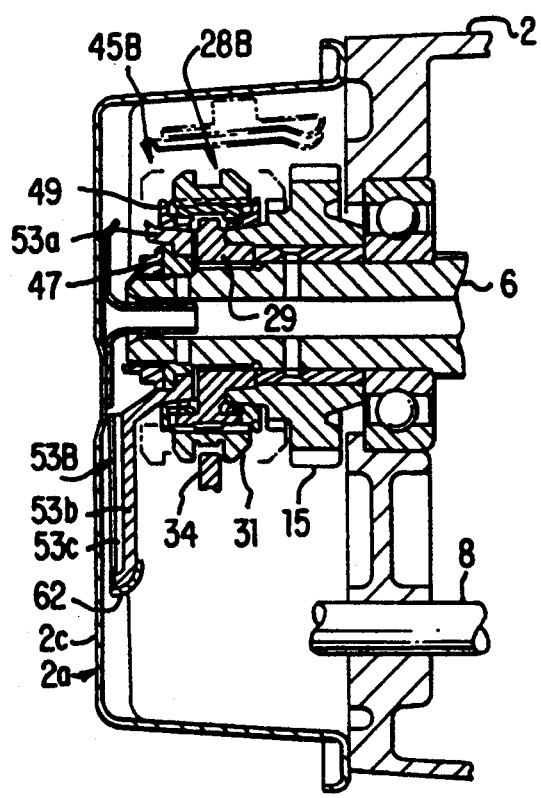
FIG. 9 is a longitudinal-sectional view of a transmission having a structure of a reverse brake in accordance with still another preferred embodiment of the present invention.
Figure 10:
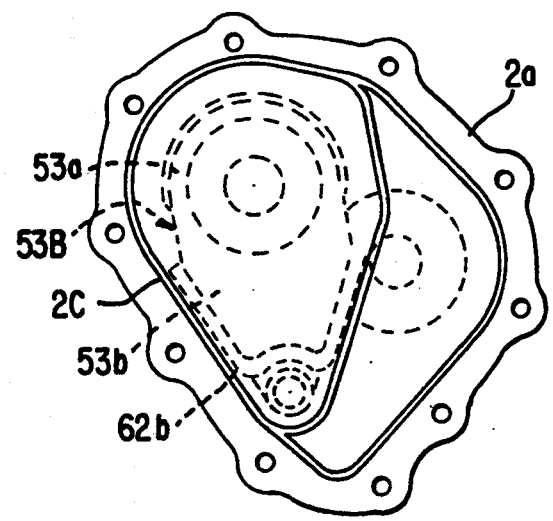
FIG. 10 is a rear view of the reverse brake mechanism of FIG. 9.

Referring to FIGS. 9 and 10, a reverse brake mechanism 45B in accordance with another preferred embodiment of the present invention is shown, which cooperates with a fifth gear synchronizing mechanism 28B. The reverse brake mechanism 45B includes a brake drum 53B, which is externally, relatively loosely fitted to a sleeve 47 positioned rearward of a clutch hub 29 of the fifth gear synchronizing mechanism 28B. The brake drum 53B is formed with a tapered boss 53a on which a synchronizing ring 49 is loosely mounted for rotation. The brake drum 53B is further formed with a tongue-like extension 53b. The extension 53b has a V-shaped back protuberance 53c. The case cover 2a is formed with an internal groove 2c shaped to accord the V-shaped back protuberance 53c of the extension 53b. The extension 53b is provided with an elastic corner spacer 62b around a lower half portion thereof which is retained in and by the internal groove 2c of the case cover 2a.

In the same manner as described above, when a shift rod 40 moves rearward, the synchronizing ring 49 of the reverse brake mechanism 45B is pressed against the tapered boss 53a of the brake drum 53B so as to gradually develop contact resistance between the synchronizing ring 49 of the reverse brake mechanism 45 and the tapered boss 53a of the brake drum 53B whose tongue-like extension 53b is received and retained in the internal groove 2c of the case cover 2 by means of the elastic corner spacer 62b. This creates brake force acting on the primary shaft 6. Finally, the primary shaft 6 is synchronized in operation with the secondary shaft 8 which remains stopped. In this embodiment, rotational force acting on the brake drum 53B is dispersed by the internal groove 2c, noise or sound and vibration transmitted to the case cover 2a are greatly reduced and effectively absorbed by the elastic corner spacer 62b.

It is also to be understood that although the present invention has been described in detail with respect to a preferred embodiment thereof, various other embodiments and variants may occur to those skilled in the art. Such other embodiments and variants falling within the scope and spirit of the invention and are intended to be covered by the following claims.

What is claimed is:

1. In combination, an automobile transmission and a reverse brake mechanism for the automobile transmission comprising:

a primary shaft through which engine torque is transmitted to the automobile transmission;

a secondary shaft through which engine torque is transmitted from the automobile transmission;

a clutch sleeve mounted for sliding movement on the primary shaft and having peripheral clutch teeth with chamfers arranged at regular separations, said clutch sleeve being fixed for rotation with the primary shaft;

a synchronizing ring mounted for rotation on the primary shaft and having peripheral synchronizing teeth with chamfers arranged at regular separations, each of which is larger than a circumferential width of each of said peripheral clutch teeth; and brake means for braking the primary shaft, said brake means being operationally coupled to said primary shaft through said synchronizing ring while said clutch sleeve is brought into engagement with said synchronizing ring through the chamfers of said peripheral clutch teeth and said peripheral synchronizing teeth when shifting the automobile transmission to a reverse gear;

said clutch sleeve, said synchronizing ring and said brake means together forming a synchronizing mechanism for synchronizing, in rotation, said primary shaft and said secondary shaft.

2. A combination as defined in claim 1, wherein said brake means is fictionally coupled to said synchronizing ring when said synchronizing ring is forced axially by said clutch sleeve before said peripheral clutch teeth of said clutch sleeve are brought into engagement with said peripheral synchronizing teeth of said synchronizing ring.

3. A combination as defined in claim 2, wherein said brake means is frictionally coupled to said synchronizing ring when said synchronizing ring is forced axially by said clutch sleeve.

4. A combination as defined in claim 3, wherein each of said peripheral synchronizing teeth with chamfers has the same shape as a half of each of said peripheral clutch teeth with chamfers.

5. A combination as defined in claim 2, wherein said brake means comprises a primary brake gear mounted for rotation on the primary shaft and a secondary brake gear mounted for relative rotation with the secondary shaft, said primary brake gear being in mesh with said secondary brake gear at all times and being able to be operationally coupled to said primary shaft through said synchronizing ring.

6. A combination as defined in claim 1, and further comprising a case cover surrounding said synchronizing mechanism, wherein said brake means comprises a brake drum mounted for relative rotation on the primary shaft and fixed to said case cover.

7. A combination as defined in claim 6, wherein said brake drum is formed integrally with a plurality of arms radially extending therefrom through which it is secured to said case cover.

8. A combination as defined in claim 7, wherein said brake means includes an elastic member disposed between each of said plurality of arms radially extending from said brake drum and said case cover.

9. A combination as defined in claim 1, and further comprising a case cover surrounding said synchronizing mechanism, wherein said brake means comprises a brake drum mounted for relative rotation on the primary shaft and retained by said case cover.

10. A combination as defined in claim 9, wherein said brake drum is formed integrally with an extension radially extending therefrom through which it is retained by said case cover.

11. A combination as defined in claim 10, wherein case cover is formed with a groove for retaining said extension therein.

12. A combination as defined in claim 11, wherein said brake means includes an elastic member disposed between said extension and said case cover.

* * * * *